United States Patent [19]
Breer

[11] 3,788,337
[45] Jan. 29, 1974

[54] APPARATUS AND PROCESS FOR MIXING COMPONENTS WHICH REACT QUICKLY WITH ONE ANOTHER, MORE ESPECIALLY FOR THE PRODUCTION OF FOAM MATERIALS

[75] Inventor: Karl Breer, Cologne, Germany
[73] Assignee: Bayer Aktiengesellschaft, Leverkusen, Germany
[22] Filed: Dec. 2, 1971
[21] Appl. No.: 204,319

Related U.S. Application Data
[63] Continuation-in-part of Ser. No. 14,910, Feb. 27, 1970.

[30] Foreign Application Priority Data
Mar. 13, 1969   Germany.................. 19 12 734

[52] U.S. Cl............. 137/1, 23/252 R, 425/4, 425/155, 137/637, 137/563, 259/8
[51] Int. Cl....................... B28b 13/00, F16k 11/24
[58] Field of Search.. 23/252; 425/4, 130, 155, 462, 425/463; 259/4, 7, 8; 137/563, 607, 608, 637, 1

[56] References Cited
UNITED STATES PATENTS

| | | | |
|---|---|---|---|
| 3,186,688 | 6/1965 | Michael | 259/4 X |
| 2,955,608 | 11/1960 | Stone | 137/637 X |
| 3,220,801 | 11/1965 | Rill et al. | 259/4 X |
| 3,607,124 | 9/1971 | Zippel | 259/8 X |

Primary Examiner—Henry T. Klinksiek
Attorney, Agent, or Firm—Ralph D. Dinklage et al.

[57] ABSTRACT

Components which react quickly with one another, are mixed for the production of foam materials within a mixing chamber which is equipped with simultaneously acting electromagnetic actuating devices for the injectors.

19 Claims, 2 Drawing Figures

APPARATUS AND PROCESS FOR MIXING COMPONENTS WHICH REACT QUICKLY WITH ONE ANOTHER, MORE ESPECIALLY FOR THE PRODUCTION OF FOAM MATERIALS

This application is a continuation-in-part of Ser. No. 14,910, filed Feb. 27, 1970, now abandoned.

The present invention relates to an apparatus for mixing components which react quickly with one another, more especially for the production of foam materials, advantageously polyurethane. The mixing apparatus comprises a stirrerless mixing head having a number of supply pipes corresponding to the number of components to be introduced into the mixing head, the outlet openings of said supply pipes having injectors.

Known mixing apparatus of this type, for example, for the production of polyurethane foam material, comprise injectors which open and close automatically under the working pressure of the components to be introduced into the mixing chamber.

The separate components are, however, subjected to viscosity fluctuations over a period of time. The delivery quantities are changes slightly relative to one another, or the piping system has leaks. By means of a so-called storage arrangement with an adjustable piston in the supply pipes, it is possible to compensate for these differences in order to achieve an introduction of the components in timed synchronism into the mixing chamber. If the opening and closing of the injectors does not take place simultaneously, a "lead" of one or more components is obtained. In this case, the foam material element which is produced has a hole on its upper surface.

If visible surfaces are affected by such defective zones, these manufactured elements are unsuitable for use.

The aforementioned known apparatus is very complicated and troublesome to regulate so as to achieve the synchronous introduction of the components into the mixing chamber. The adjustment or setting had to be constantly checked during operation.

It is an object of the present invention to provide an apparatus which avoids the "lead" of one or more components, without particular adjustment and checks being necesary.

This is achieved according to the invention by the injectors comprising simultaneously operating electromagnetic actuating devices. They guarantee timed synchronous opening and closing of the injectors.

One particularly simple embodiment of the apparatus according to the invention is characterised in that the actuating devices are connected through a common switch to a voltage source. This simple circuit contributes to the susceptibility of the apparatus to interruptions.

The actuating devices advantageously consist of energising coils, the iron cores of which represent the stems of the injectors. This construction is particularly simple, because it is possible in this way to avoid a heavy expenditure in construction, such as would be necessary with mechanical, pneumatic or hydraulic actuating devices.

The injectors are advantageously equipped in a manner known per se with return springs. If the energising coils are switched on, the valve stems are moved in an opposite direction to the spring force. On switching off the energising coils, the injectors are returned by the springs into their intial position.

According to one particular embodiment of the apparatus according to the invention, channel valves are arranged in a manner known per se between the delivery pumps and the mixing head. These valves are adapted to be actuated according to the invention by the advance time relay. The result achieved is that when the injectors are closed, they remain under pressure, even when the delivery pumps are not operating. If the mixing operation is initiated by actuating the release switch, then, with the opening of the injectors, simultaneously, through the advance time relay, the channel valves are switched from the closed or by-pass positions to the open or through flow positions for the supply of the components for the set time.

A more simple embodiment merely provides pipe branches instead of channel valves.

When the invention is used in connection with an apparatus with continuously operated delivery pumps, an adjustable time relay is arranged according to the invention between the actuating devices and a release switch. The time relay is adjustable to a certain open time of the injectors which is necessary in order to introduce the required quantities of the components into the mixing chamber of the mixing head. The components are thus mixed and advantageously released into a mould.

When the invention is used in an apparatus having intermittently operated delivery pumps, the release switch according to the invention is, on the one hand, connected to the pump driving means and, on the other hand, through a time-delay relay and an adjustable advance time relay and the switch to the actuating devices. The effect thus obtained is that the delivery pumps initially pump the components in circulation into the piping systems, so that uninterrupted flow conditions already exist on opening the injectors.

It is understood that, in apparatus operating in a fully automatic manner with moulds to be periodically filled, the release switch can be controlled in dependence on the working cycle.

Various embodiments of the apparatus according to the invention are shown diagrammatically and by way of example in the drawing and are now to be more fully explained.

In both Figures, the stirrerless mixing head with the actuating devices of the injectors is fully illustrated; the remaining part of the apparatus is in each case shown in the form of a block diagram.

Figure 1:
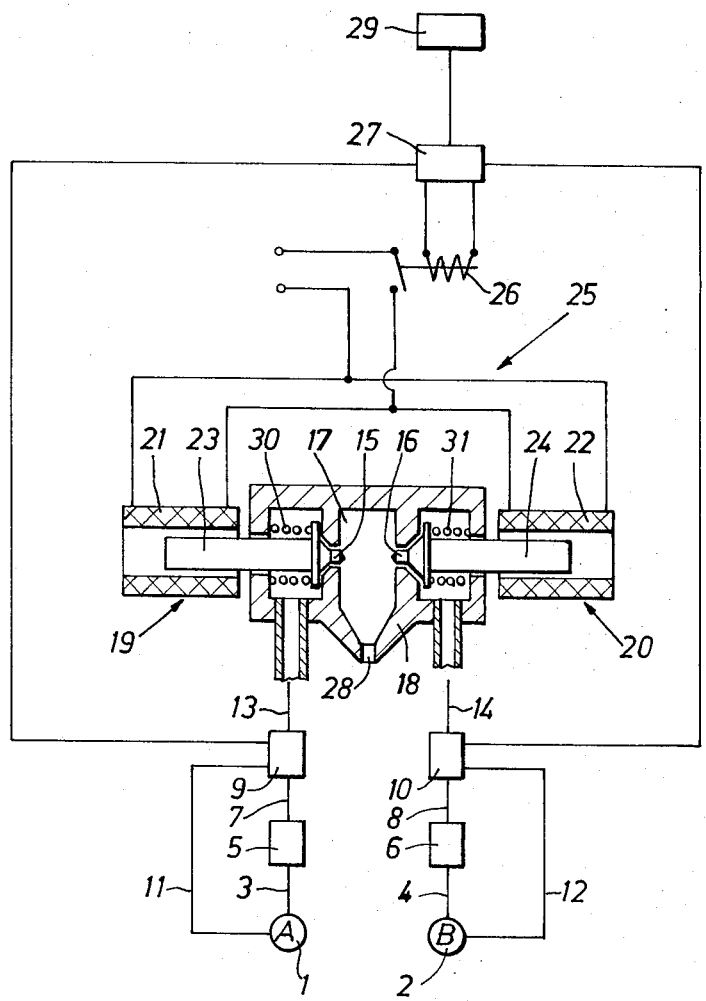
FIG. 1 shows the apparatus with continuously operated delivery pumps.

In FIG. 1, the components A and B are stored in the reservoirs 1 and 2, respectively. They are drawn in by the delivery pumps 5 and 6 through the pipes 3 and 4, respectively. Through pipes 7 and 8, the components A and B are supplied to the channel valves 9 and 10, respectively. Depending on their position, the components flow back through the pipes 11 and 12 into the storage reservoirs 1 and 2, or in the other position of said valves 9 and 10, they flow through the pipes 13 and 14 and the injectors 15 and 16 into the stirrerless mixing chamber 17 of the mixing head 18. The actuating devices 19 and 20 of the injectors 15 and 16 consist of the energising coils 21 and 22, the iron cores of which form the valve stems 23 and 24. They are connected to a circuit 25, which can be opened and closed by a switch 26. This switch 26 is connected to an advance time relay 27, through which it is operated. This advance time relay 27 is adjustable to a time period which corresponds to the opening time of the injectors 15 and 16 (time period injectors are open) in order to allow the quantities of components necessary to fill the mould to enter the mixing chamber 17, which operates as a throughflow chamber. The mixture forming the foam material, when injectors 15 and 16 are open, continuously leaves the mixing chamber 17 through the outlet nozzle 28. The actuating devices 19 and 20 are released (for operation) through the release switch 29. The return springs of the injectors 15 and 16 are indicated at 30 and 31. The channel valves 9 and 10 are actuated simultaneously with the injectors 15 and 16 by the time relay 27.

In FIG. 1 the pumps run continuously. Initially, with release switch 29 open, the switch 26 is open so that injectors 15 and 16 are closed, and valves 9 and 10 are positioned so that the pump outputs are directed to the by-passes 11 and 12. Upon depressing switch 29, advance time relay 27 is activated and operates so that: (1) switch 26 is closed whereupon injectors 15 and 16 are opened, and (2) the valves 9 and 10 are moved to the delivery position for delivery of the pump outputs to the mixing chamber 18, and (3) the time relay mechanism in advance time relay 27 commences operation for measurement of the time interval for which it is set. At the end of said time interval, the advance time relay 27 operates to open switch 26 and return valves 9 and 10 to the first mentioned position, and to deenergize coils 21 and 22 so that the injectors 15 and 16 are closed. The described operation is then repeated by depressing the release switch 29, either manually or by automatic means. The delay time period for which time relay 127 is set depends on the dose to be delivered by the mixing head 18 as is the case for prior art devices used for the same service.

Figure 2:
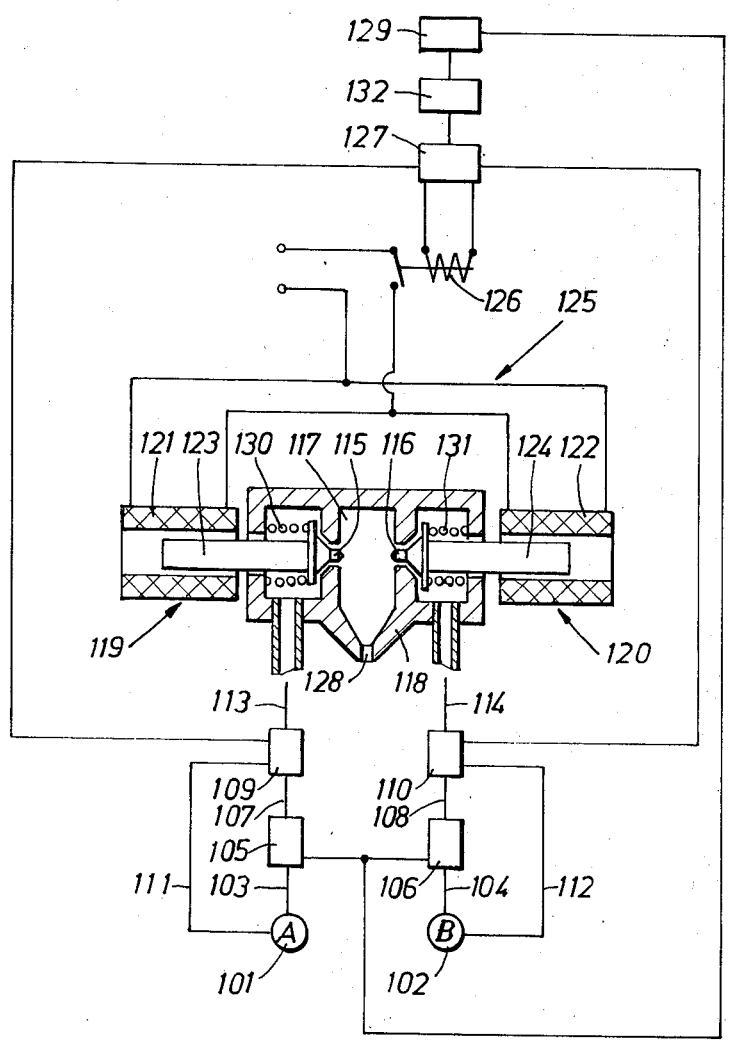
FIG. 2 shows the apparatus with intermittently operated delivery pumps.

In FIG. 2, the components A and B are contained in the reservoirs 101 and 102, respectively, and they are drawn through pipes 103 and 104 by the delivery pumps 105 and 106. The components A and B are conveyed to the channel valves 109 and 110 through pipes 107 and 108. Depending on their position components flow back through the pipes 111 and 112 into the storage reservoirs 101 and 102. In the other position of said valves 109 and 110, they flow through the pipes 113 and 114 and the injectors 115 and 116 into the mixing chamber 117 of the mixing head 118. The actuating devices 119 and 120 of the injectors 115 and 116 consist of the energising coils 121 and 122, of which the iron cores from the valve stems 123 and 124. They are disposed in a circuit 125 which can be opened and closed by a switch 126. This switch 126 is connected to an advance relay 127, through which it is operated. The said relay 127 is adjustable to a time interval which corresponds to the opening time of the injectors 115 and 116, in order to admit into the mixing chamber 117, which acts as a throughflow chamber, the quantities of components necessary for filling the mould. The mixture forming the foam material continuously leaves the stirrer-less chamber 117 through the outlet nozzle 128. A time-delay relay 132 is arranged before the time relay 127. Relay 132 is released by the release switch 129. The release switch 129 simultaneously with actuation of relay 132, acts as the means for switching on the drives of the delivery pumps 105 and 106. With operation of the release switch 129, thus, before actuation of relay 127 and thereby switch 126, the delivery pumps 105 and 106 are switched on, by which the components are pumped in circulation through the pipes 111 and 112. The time-delay relay 132 is so adjusted that steadying and stabilising of the flow occurs in the piping systems before the channel valves 109 and 110 are swwtched over and the injectors 115 and 116 are opened. After the switch 126 has again broken the circuit 125 through operation of the advance time relay 127, the energising coils 121 and 122 are again without current and the injectors 115 and 116 are brought into the closing position by the return springs 130 and 131. For interruption of the dosing, the channel valves 109 and 110 are actuated simultaneously with the injectors 115 and 116 by the advance time relay 127 to direct the output of the pumps into lines 111, 112, as is described in more detail hereinafter.

At the end of the operating time of time relay 127, an impulse is passed to the valves 109 and 110 from time relay 127 to direct components into the by-pass lines 110 and 112. Another impulse is passed back to the time relay 132 which gives after a selected delay interval an impulse to the release switch 129 which passes an impulse to pumps 105, 106 so that the pumps are shut off.

The embodiment shown in FIG. 2 differs from that shown in FIG. 1 in that, in the FIG. 2 embodiment, the pumps are operated intermittently. Further, provision is made in FIG. 2, for starting the pumps before valves 109 and 110 open for passage of materials to the mixing head 118. The delay time between starting of the pumps and opening of the valves (by which is meant shifting of the valves 109, 110 from the by-pass positions to the through flow to mixing head positions) is such as to provide the steady state conditions of pumping desired for the through flow operation. The time delay can be 0.1 – 5 seconds, preferably 0.5 – 1 second. The operating time of through flow operation, as in the case of operation according to FIG. 1, depends on the dose to be delivered by the mixing head. That operating time can up to 30 seconds, or 1 minute or even more. The delay time, following the dosing, between closing of the valves 109 and 110 (by which is meant shifting of the valves 109, 110 from the through flow positions in which they are set to deliver the components to the mixing head 118, to the by-pass positions), is such that flow of components to the mixing head is not influenced by the decrease in the pressures which accompany shut down of the pumps. This delay time prevents leakage at the injectors 115,116, which occurs, apparently as a result of vibration, when the delay time is not employed. The delay can be the same as the delay time between starting of the pump and opening of the valves 109 and 110. Thus it can be 0.1 –5 seconds, preferably 0.5 –1 second.

An advantage of the operation according to FIG. 2, i.e., intermittent operation of the pumps, is that the components are not subjected to the working thereof which occurs in the operation according to FIG. 1, when, the bypass valves are closed and the pumps are running. Such working, which involves the dissipation of the energy imparted to the components by the pumps, can have an adverse effect on the composition of the components, such as various partial decomposition reactions, including reactions which generate gas in the components, which should be avoided since the pressure of gas in the components may result in faults in the molded articles.

Whereas, with intermittent operation of the pumps, the time delay between starting of the pumps and opening of the valves 109, 110, and the time delay between closing of the valves 109 and 110 and stopping of the pumps, are desirable for the reasons explained, yet those delays are not essential, and the apparatus could be operated without either or both of those delays.

What is claimed is:

1. An apparatus for mixing components which react quickly with one another, the mixing apparatus comprising a stirrerless mixing head with a number of supply pipes corresponding to the number of components to be introduced into the mixing head, the outlets of said supply pipes being connected to the mixing head and equipped at the mixing head with injector valves, and simultaneously acting electromagnetic actuating devices for opening and closing the valves for controlling flow of the components into the mixing head, the actuating devices comprising energizing coils having cores which form the stems of the injectors.

2. An apparatus according to claim 1, characterised in that the actuating devices are connected through a common switch to a voltage switch.

3. An apparatus according to claim 1 characterised in that the cores are iron.

4. An apparatus according to claim 1 characterised in that the injectors are equipped with return springs.

5. An apparatus according to claim 1, a pump operatively disposed in each supply pipe, a return line for each pump communicating the pump outlet with the pump inlet, a channel valve in each supply pipe between the pump disposed therein and the mixing head for switching pump output between the supply pipe to the mixing head and a return line, and actuating means operatively interconnected with the channel valves and the actuating devices for actuating the channel valves and the actuating devices for flow of the components from the pumps to the mixing head for the mixing, and for flow of the components into the return lines when the actuating devices are closed.

6. An apparatus according to claim 5 said actuating means comprising an advance time relay for time control of the mixing period.

7. An apparatus according to claim 5, and means connected to said pump for continuously operating said pumps.

8. An apparatus according to claim 7, said actuating means comprising an advance time relay for time control of the mixing period.

9. An apparatus according to claim 5, said actuating means being an advance time relay.

10. An apparatus according to claim 5, said actuating means simultaneously actuating the channel valves and the actuating devices.

11. Apparatus according to claim 5, and drive means connected to each pump, and control means for starting the pump drive means, and controlling operation of the actuating means, said control means starting the pump drive means in advance of operation of the actuating means for flow from the pumps to the mixing head.

12. An apparatus according to claim 11, said actuating means simultaneously actuating the channel valves and the actuating devices.

13. An apparatus according to claim 5, and drive means connected to the pumps, and control means for starting and stopping of the pump drive means, and controlling operation of the actuating means, said control means starting the pump drive means in advance of operation of the actuating means for flow from the pumps to the mixing head, and stopping the pump drive means after operation of the actuating means switching output of the pumps to the return lines.

14. An apparatus according to claim 13 said actuating means comprising an advance time relay for time control of the mixing period.

15. An apparatus according to claim 13, said actuating means simultaneously actuating the channel valves and the actuating devices.

16. An apparatus for mixing components which react quickly with one another, the mixing apparatus comprising a storage vessel for each of the components, a mixing head for mixing of the components, a supply pipe communicating each of the storage vessels and the mixing head, a pump having a drive means operatively interposed in each of the supply pipes, a return line for each pump communicating the pump outlet with the pump inlet, an injector valve in each supply pipe between return line and the mixing head for intermittent introduction of the components into the mixing head, a channel valve in each supply pipe for switching flow between the return conduit and the supply pipe to the mixing head, and control means operatively connected to the pump drive means and the channel valves for successively starting the pump drive means and switching the channel valves from the return conduit to the supply pipe fo the mixing head.

17. In a process for production of articles from components which react quickly with one another, comprising separately pumping the components with intermittently operated pumps through supply pipes outfitted with valves, to a mixing head therefor, and intermittently opening and closing the valves for controlling flow of the components into the mixing head, the improvement which comprises starting the pumps before opening the valves and in the interval between starting of the pumps and opening of the valves circulating the discharges from the pumps to the pump inlets for stabilization of flow of the components before opening of the valves.

18. Process according to claim 17, said components reacting to form foamed materials.

19. Process according to claim 17, said components reacting to form polyurethane foamed plastic.

* * * * *